United States Patent [19]

Iwako

[11] Patent Number: 5,064,099
[45] Date of Patent: Nov. 12, 1991

[54] FEEDING DEVICE FOR PARTICULATE MATERIALS

[75] Inventor: Motonari Iwako, Tokyo, Japan

[73] Assignee: Kabushiki Kaisha Funken Powtechs, Tokyo, Japan

[21] Appl. No.: 478,500

[22] Filed: Feb. 12, 1990

[30] Foreign Application Priority Data

Oct. 2, 1989 [JP] Japan .................................. 1-29685

[51] Int. Cl.⁵ .............................................. B67D 5/60
[52] U.S. Cl. ................... 222/142; 222/145; 222/312; 222/314; 222/317; 222/132
[58] Field of Search ............. 222/132, 142, 145, 264, 222/311, 312, 314, 156, 157, 317

[56] References Cited

U.S. PATENT DOCUMENTS

| | | | |
|---|---|---|---|
| 775,350 | 11/1904 | Gerard | 222/314 X |
| 1,345,120 | 6/1920 | Bissell et al. | 222/317 |
| 3,173,582 | 3/1965 | Walter | 222/132 |
| 3,556,418 | 1/1971 | Hokana | 222/311 |
| 4,053,088 | 10/1977 | Grataloup | 222/314 |
| 4,158,427 | 6/1979 | Hegge | 222/317 |
| 4,257,334 | 3/1981 | Mueller | 222/317 X |
| 4,480,948 | 11/1984 | Dreyer | 222/342 X |

FOREIGN PATENT DOCUMENTS

| | | | |
|---|---|---|---|
| 9033 | 7/1885 | Fed. Rep. of Germany | 222/142 |
| 2555011 | 7/1977 | Fed. Rep. of Germany | 222/142 |
| 536221 | 3/1983 | Japan | 222/312 |

Primary Examiner—Kevin P. Shaver
Attorney, Agent, or Firm—Wenderoth, Lind & Ponack

[57] ABSTRACT

A particulate material feeder includes a hopper sectioned into two receptacles for accommodating two different kinds of particulate materials. Each particulate material falling down through a bottom opening of the receptacle is introduced into a feed channel defined between a feed roller having a frictional periphery and a control gate having a semi-circular cross-section. Thus, a pair of feeding systems for two different kinds of the particulate materials are symmetrically provided within a single apparatus. An opening degree of the feed channel may be controlled separately and independently in each feeding system so that a definite mixing rate of the two kinds of particulate material can be obtained as desired. On the contrary, the feed rollers provided in the two feed systems are driven by a single driving source and are thus rotated at the same speed. This rotational speed determines a feed rate of the particulate materials which, with the present device, are premixed at a given mixing rate and obtained in a common region disposed beneath the feed rollers. One of the receptacles may further be divided into sub-sections to accommodate an additional kind of particulate material such as additive.

15 Claims, 4 Drawing Sheets

FEEDING DEVICE FOR PARTICULATE MATERIALS

BACKGROUND OF THE INVENTION

1. Field of the Invention

This invention relates to a device for feeding particulate materials at a constant feed rate. This invention relates particularly to a constant-rate feeding device capable of feeding different kinds of particulate materials with a predetermined mixing ratio.

2. Description of the Prior Art

I have already proposed in Japanese utility-model publication No.(Sho) 53-6221 a feeding device for particulate materials which comprises a hopper having a bottom surface inclined by more than a rest angle of the particulate materials to be fed, and a feed roller provided near an outlet of the hopper and having a frictional peripheral surface for feeding the particulate materials with friction therebetween during its rotation. There is provided a control gate having a semi-circular section which is rotatable about an axis extending in the axial direction of the feed roller and cooperates with the feed roller to provide a material passing channel therebetween. The particulate material fed through the channel is collected in a chute disposed beneath the feed roller.

With this prior art device, a feed rate of the particulate materials is determined on the basic of the opening degree of the channel and the rotating speed of the feed roller, and may therefore be easily regulated by adjusting the rotational angle of the control gate and/or by changing the feed roller revolution speed. It has been demonstrated that the feeding device of this type operates favorably when the particulate materials to be fed are of a single kind.

In some cases it is necessary to feed two or more different kinds of particulate materials at a predetermined mixing rate. In such a case, in order to maintain the predetermined mixing rate throughout operation, it is necessary to feed the respective kinds of the particulate materials at constant feed rates. It is also to be contemplated that the particulate materials, as mixed at the predetermined mixing rate, should be supplied to the next stage of operation at a predetermined feed rate.

When several different kinds of the particulate materials are to be fed at a given feed rate while being premixed at a given mixing rate, a corresponding number of the feed devices disclosed in my earlier Japanese publication may be employed for the respective kinds, which, however, would result in an extremely large-size equipment and require considerable costs. Moreover, it would be difficult to control separately the control gate positions and/or the feed roller speeds in the respective devices, so as to maintain the predetermined mixing ratio while increasing or decreasing a feed rate or quantity of the particulate materials in the mixed state.

When the aforementioned feed device is applied for continuously feeding a large quantity of the particulate materials, it would be necessary to employ a feed roller having a considerable axial length and a greater diameter. This results in a larger-size device and increases costs for equipment.

SUMMARY OF THE INVENTION

It is therefore an object of this invention to provide an improved of a feeding device which is particularly suitable for treatment of several different kinds of particulate materials.

Another object of this invention is to provide a feeding device capable of continuously feeding a large quantity of particulate materials, which may be of a single kind, with minimized size and cost for equipment.

According to an aspect of this invention there is provided a device for continuously feeding particulate materials which comprises a hopper having a bottom surface inclined by more than a rest angle of the particulate materials to be fed; first partition means for dividing the interior of the hopper into plural receptacle sections adapted to receive the particulate materials, respectively; rotating feed rollers disposed in parallel with one another beneath outlets provided at bottoms of the receptacle sections, respectively, the feed rollers axially extending in parallel with the first partition means; single drive means for rotating the feed rollers simultaneously at a predetermined speed; control gates having semi-circular cross-sections respectively disposed near the feed rollers to provide feed channels therebetween extending in the axial direction of the feed rollers; and separate control means for rotating the control gates to vary rotational angles of the control gates, thereby independently controlling opening degrees of the feed channels, respectively.

According to another aspect of the invention there is provided a device for continuously feeding particulate materials which comprises a hopper having a bottom surface inclined by more than a rest angle of the particulate materials to be fed, a lower part of the hopper being divided into plural openings through which the particulate materials contained in the hopper may fall down successively; plural rotating feed rollers disposed in parallel with one another beneath the openings, respectively; single drive means for rotating the feed rollers simultaneously at a predetermined speed; control gates having semi-circular cross-sections respectively disposed near the feed rollers to provide feed channels therebetween extending in an axial direction of the feed rollers; and separate control means for rotating the control gates to vary rotational angles of the control gates, thereby independently controlling opening degrees of the feed channels, respectively.

BRIEF DESCRIPTION OF THE DRAWINGS

Further objects and advantages of this invention can be fully understood from the following detailed description when read in conjunction with the accompanying drawings in which.

DETAILED DESCRIPTION OF THE INVENTION

Figure 1:
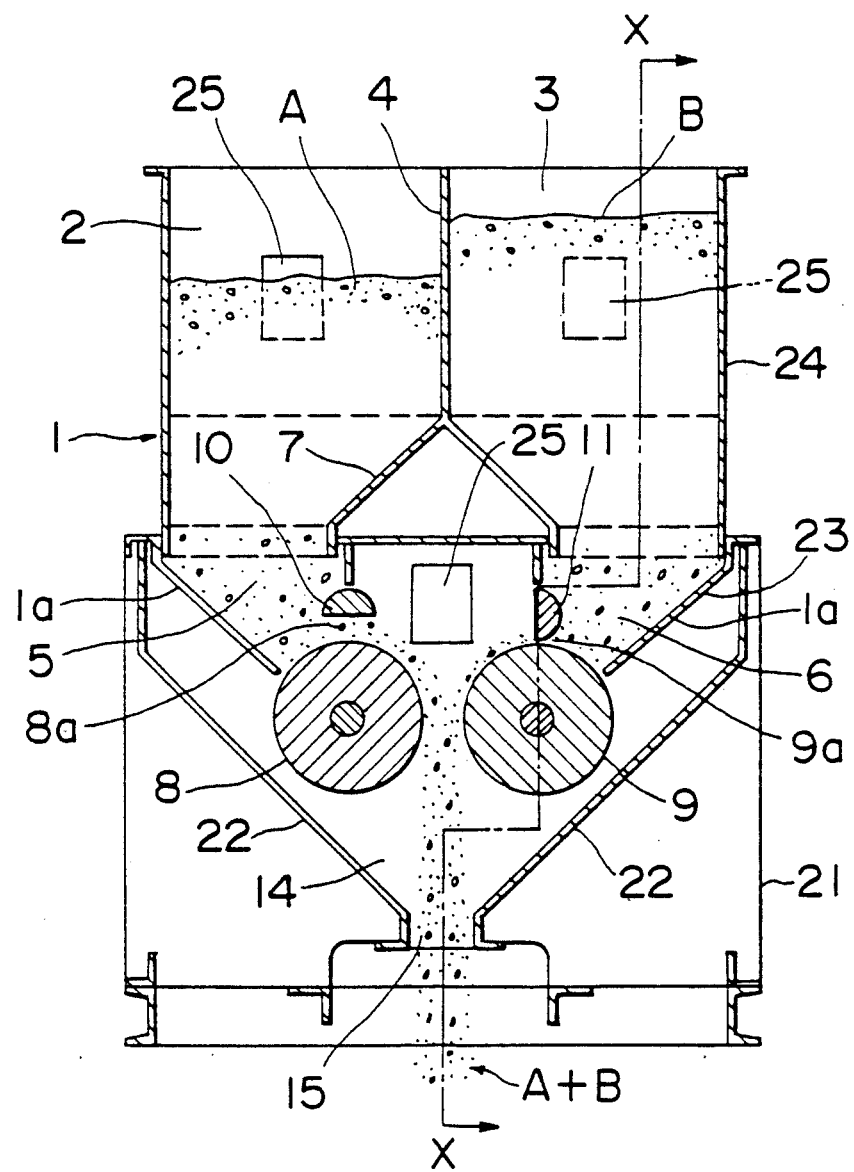
FIG. 1 is sectional front view showing a feeding device embodying the invention.
Figure 2:
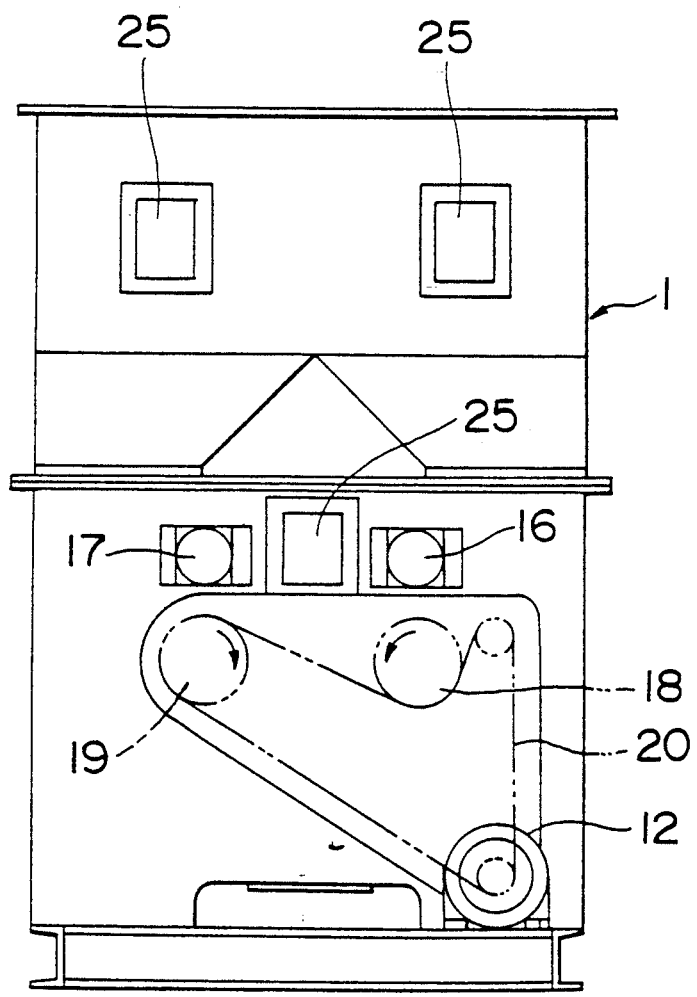
FIG. 2 is a rear view of the feeding device.
Figure 3:
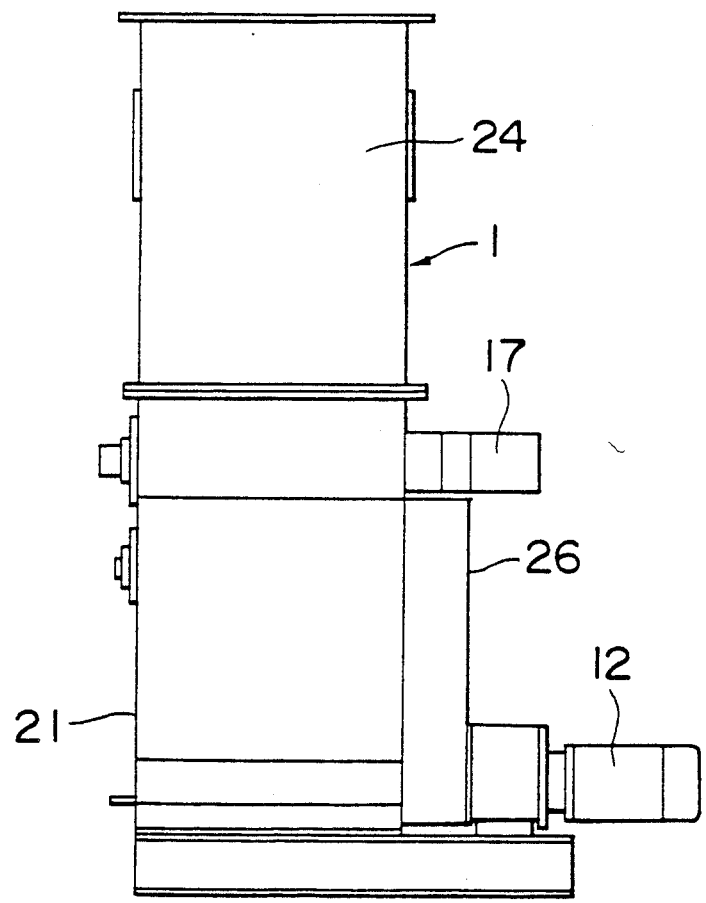
FIG. 3 is a side view of the feeding device.

A particulate material feeding device embodying the invention will now be described with reference to FIGS. 1 to 4. The device includes a hopper 1 having a bottom surface 1a inwardly inclined by more than a rest angle of the material to be fed. The hopper 1 is composed of an upper box-shaped section 24 and a lower section 23 contoured by the inclined surface 1a to have a decreasing diameter toward the bottom. The interior of the hopper 1 is divided by a partition wall 4 into two sections 2 and 3 which are adapted to receive different particulate materials A and B, respectively. The particulate materials A and B contained in the receptacles 2 and 3 can be seen from the outside through transparent windows 25 which facilitate supply and replenishment of the materials into the respective receptacles and inspection of the operating condition.

The lower end of the partition wall 4 is formed into a branched partition 7, thereby symmetrically providing outlets 5 and 6 through which the particulate materials A and B contained in the receptacles 2 and 3 may be discharged therefrom, respectively. Beneath the respective outlets 5 and 6 there are provided feed rollers 8 and 9 and control gates 10 and 11 having semi-circular sections, thereby providing material passing channels 8a and 9a between the feed roller and the control gate. The angular positions of the control gates 10 and 11 may be changed separately by energizing control motors 16 and 17 so that quantities of the materials to be fed through the respective channels 8a and 9a may be regulated as desired. In FIG. 1, the control gate 10 is shown positioned such that the material A can be fed by the feed roller 8 at a maximum feed rate, whereas the control gate 11 is shown positioned so as to define the narrowest channel 9a which will allow the material B to be fed by the feed roller 9 at a minimum feed rate.

The hopper 1 is supported above substantially a box-shaped base frame 21. A pair of inwardly inclined walls 22 are symmetrically provided within the base frame 21 so as to define therebetween a chute 14 adapted to introduce the materials A and B thrown by the feed rollers 8 and 9 toward a discharging port 15. A part of the materials may not be projected straight toward the discharging port 15 and may collide with the walls 22 it will then slide down along the inclined walls 22 and thus surely be discharged through the port 15.

Figure 4:
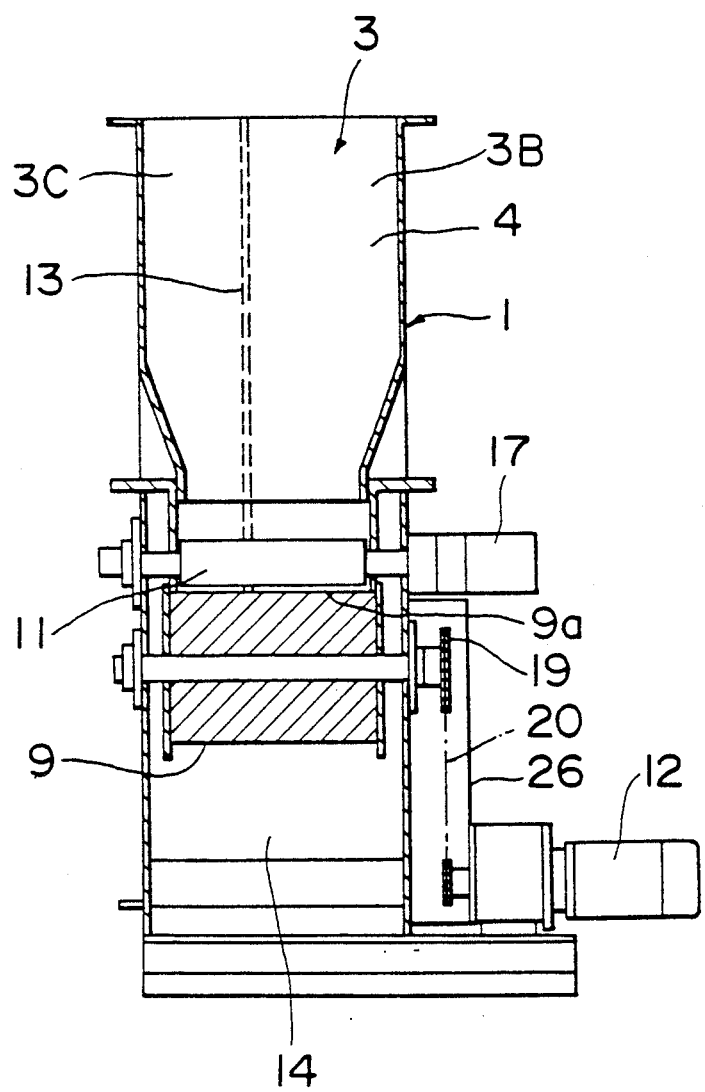
FIG. 4 is a sectional view taken along the line X—X in FIG. 1.

The feed rollers 8 and 9 are driven by a single driving source, such as an electromotor 12, to rotate in opposite directions at the same speed of rotation. For example, as particularly seen in FIG. 2, this can be achieved by having an endless chain or belt 20 trained around a shaft of the electromotor 12 and pulleys 18 and 19 of the feed rollers 8 and 9 so that, when the electromotor 12 is rotating in a clockwise direction, the feed rolers 8 and 9 are rotated in opposite directions as shown by the arrows. The driving elements are covered by a detachable cover 26 (FIG. 4). Another driving mechanism such as a plurality of gears may also be employed for achieving the above object. Thus, there will be provided a downward flow of the materials between the two feed rollers 8 and 9. Preferably, in the manner disclosed in my copending application Ser. No. 07/221,916, Filed July 20, 1988, now abandoned, each of the feed rollers 8 and 9 is provided with a plurality of axially extending grooves on the outer periphery thereof, which have a width and depth sufficient to receive the particulate materials, so as to prevent the materials from slipping with respect to the feed rollers when rotating at a relatively high speed.

With the device constructed as described above, materials A and B are charged into the sectioned receptacles 2 and 3 up to sufficient levels in the upper hopper 24, respectively. After the control gates 10 and 11 have been independently adjusted to provide a desired mixing rate between the materials A and B, the driving source 12 is energized to rotate the feed rollers 8 and 9 at the same speed of rotation but in opposite directions as indicated by arrows in FIG. 2. Thus, the materials A and B are successively fed through the outlets 6 and 7 at the respective feed rates, and then projected down by the feed rollers 8 and 9 toward the common chute 14 in a joined stream. While traveling within the chute 14 from the feed rollers 8 and 9, the materials A and B are premixed with each other to some extent.

In this manner of operation, two different kinds of particulate materials can be successively fed by the feed rollers at a constant feed rate. Since the feed rollers 8 and 9 are driven by the same driving source 12, the mixing rate of the materials A and B will be determined by the angular position of the control gates 10 and 11 which govern the degree of opening of each of the channels 8a and 9a between the control gates and the feed rollers. The operator's only concern should be directed to separate control of the angular position of the control gates 10 and 11 to provide a desired mixing rate. Meanwhile, the feed rate of the materials A and B, as mixed, is determined by the rotating speed of the feed rollers 8 and 9. When the revolution speed of the driving source 12 is changed, an amount of the materials A and B, as mixed, to be supplied to the chute 14 will proportionally be increased or decreased, with the mixing rate therebetween remaining unchanged.

If an additional kind of particulate material other than the materials A and B, such as an additive and a dispersing agent, should also be supplied, one of the sectioned receptacles may be divided by a partition 13, (shown by Phantom lines in FIG. 4,) into two sub-sections 3B and 3C. The partition 13 extends between a peripheral wall of the upper hopper section 24 and the central partition wall 4. In this example, one sub-section 3C having a smaller volume is adapted to contain the additive or dispersing agent. The material B in the sub-section 3B and the additional material in the sub-section 3C are supplied by the feed roller 9 in such manner as hereinbefore described, with a given mixing rate which is determined by a position of the partition 13. This mixture is then further mixed with the other material A in the chute 14 at a predetermined feed rate which is determined by the angular position of the control gates 10 and 11.

The device illustrated is also applicable when a large quantity of a single kind of particulate material is to be supplied at a desired feed rate. Preferably, in such a modified device, the central partition wall 4 is removed to provide a single large receptacle for the material. The particulate material contained in the single receptacle in the upper hopper 25 will be divided by the branched partition 7 into two streams, one being fed through the channel 8a and the other through the channel 9a. These two streams are joined together in the chute 14 so that the material is discharged through the port 15 with a predetermined feed rate which is regulated by the angular position of the control gates 10 and 11 and/or the feed roller revolution. The case may be that one of the control gates is retained in a fixed position while the other is designed to be controllable, which facilitates definite control of the feed rate by simply regulating the angular position of the other control gate. The device is particularly suitable to deal with a large quantity of the single particulate material at a definite feed rate, as compared with the prior art device which employs a single feed roller having a considerable axial length and a larger diameter, and is thus of a large size and high cost.

Although the invention has been described in conjunction with specific embodiments thereof, it is to be understood that many variations and modifications may be made without departing from the spirit and scope of the invention as defined in the appended claims.

What is claimed is:

1. A device for continuous feeding of particulate material, comprising:
   a hopper having an inclined bottom surface;
   first partition means for dividing an interior of said hopper into a plurality of receptacle sections adapted to receive discrete quantities of the particulate material, respectively, each of said receptacle sections having an outlet at a bottom end thereof;
   a plurality of feed rollers mounted in parallel with said partition means and with one another adjacent said outlets of said receptacle sections, respectively;
   drive means for simultaneously rotating each of said plurality of feed rollers at a single predetermined speed;
   a plurality of control gates mounted parallel and adjacent to said plurality of feed rollers, respectively, each of said plurality of control gates having a semi-circular cross section and being adapted to rotate about an axis, a plurality of feed channels being defined between said plurality of feed rollers and said plurality of control gates, respectively; and
   control means for independently rotating each of said plurality of control gates to independently adjust a degree of opening of each of said plurality of feed channels, respectively.

2. A device as recited in claim 1, wherein
   said drive means comprises a single drive motor having an output shaft, a plurality of wheels fixed for rotation with said plurality of feed rollers, respectively, and an endless element trained about said output shaft and said plurality of wheels.

3. A device as recited in claim 1, wherein
   said plurality of feed rollers comprises two feed rollers; and
   said drive means is operable to rotate said two feed rollers such that an upper periphery of each of said two feed rollers rotates downwardly and toward the other of said two feed rollers, and such that particulate material engaged by either of said two feed rollers is fed toward a location between said two feed rollers.

4. A device as recited in claim 1, wherein
   said inclined bottom surface of said hopper comprises a pair of bottom surface sections angled downwardly and inwardly toward one another.

5. A device as recited in claim 1, wherein
   said first partition means comprises a partition wall mounted in said hopper and having a pair of branched partitions at a lower end thereof angled downwardly and outwardly away from one another.

6. A device as recited in claim 1, wherein
   said control means comprises a plurality of motors operatively connected to said plurality of control gates, respectively.

7. A device as recited in claim 1, further comprising
   a collecting chute mounted beneath said plurality of feed rollers for directing mixed particulate material to a central location.

8. A device as recited in claim 1, further comprising
   second partition means for subdividing at least one of said plurality of receptacle sections into sub-sections, such that said at least one receptacle section is adapted to accommodate discrete quantities of the particulate material, said sub-sections having a common outlet defined by said outlet of said at least one receptacle section.

9. A device as recited in claim 8, wherein
   said first partition means comprises a first partition wall mounted across said interior of said hopper; and
   said second partition means comprises a second partition wall mounted across said at least one receptacle section perpendicular to said first partition wall.

10. A device for continuous feeding of particulate material, comprising:
    a hopper having an inclined bottom surface and a plurality of openings formed in a lower portion of said hopper for allowing particulate material in said hopper to flow therethrough;
    a plurality of feed rollers mounted parallel to one another and adjacent said openings;
    drive means for simultaneously rotating each of said plurality of feed rollers at a single predetermined speed;
    a plurality of control gates mounted parallel and adjacent to said plurality of feed rollers, respectively, each of said plurality of control gates having a semi-circular cross section and being adapted to rotate about an axis, a plurality of feed channels being defined between said plurality of feed rollers and said plurality of control gates, respectively; and
    control means for independently rotating each of said plurality of control gates to independently adjust a degree of opening of each of said plurality of feed channels, respectively.

11. A device as recited in claim 10, wherein
    said drive means comprises a single drive motor having an output shaft, a plurality of wheels fixed for rotation with said plurality of feed rollers, respectively, and an endless element trained about said output shaft and said plurality of wheels.

12. A device as recited in claim 10, wherein
    said plurality of feed rollers comprises two feed rollers; and
    said drive means is operable to rotate said two feed rollers such that an upper periphery of each of said two feed rollers rotates downwardly and toward the other of said two feed rollers, and such that particulate material engaged by either of said two feed rollers is fed toward a location between said two feed rollers.

13. A device as recited in claim 10, wherein
    said inclined bottom surface of said hopper comprises a pair of bottom surface sections angled downwardly and inwardly toward one another.

14. A device as recited in claim 10, wherein
    said control means comprises a plurality of motors operatively connected to said plurality of control gates, respectively.

15. A device as recited in claim 10, further comprising
    a collecting chute mounted beneath said plurality of feed rollers for directing mixed particulate material to a central location.

* * * * *